United States Patent
Manningham et al.

(10) Patent No.: US 12,175,000 B1
(45) Date of Patent: Dec. 24, 2024

(54) SYSTEM AND METHOD FOR ANONYMOUS DATA SHARING AMONG NODES OF A PRIVATE DATA NETWORK

(71) Applicant: Blockgraph LLC, New York, NY (US)

(72) Inventors: Jason Manningham, Brooklyn, NY (US); Utpal Kalita, Montville, NJ (US)

(73) Assignee: BLOCKGRAPH LLP, New York, NY (US)

( * ) Notice: Subject to any disclaimer, the term of this patent is extended or adjusted under 35 U.S.C. 154(b) by 0 days.

(21) Appl. No.: 18/244,093

(22) Filed: Sep. 8, 2023

(51) Int. Cl.
| | |
|---|---|
| G06F 21/62 | (2013.01) |
| H04L 9/06 | (2006.01) |
| H04L 9/08 | (2006.01) |
| H04L 9/40 | (2022.01) |

(52) U.S. Cl.
CPC ........ G06F 21/6254 (2013.01); H04L 9/0643 (2013.01); H04L 9/0863 (2013.01); H04L 63/0421 (2013.01)

(58) Field of Classification Search
CPC . G06F 21/6254; H04L 9/0643; H04L 9/0863; H04L 63/0421
See application file for complete search history.

(56) References Cited

U.S. PATENT DOCUMENTS

| | | | |
|---|---|---|---|
| 9,137,238 B1 * | 9/2015 | Jakobsson | G06F 21/46 |
| 9,246,686 B1 * | 1/2016 | Holland | H04L 63/12 |
| 11,245,701 B1 * | 2/2022 | Brandwine | H04L 63/20 |
| 2004/0210763 A1 * | 10/2004 | Jonas | H04L 63/0428 |
| | | | 713/193 |
| 2013/0031372 A1 * | 1/2013 | Oltmans | H04L 9/3236 |
| | | | 713/189 |
| 2018/0075262 A1 * | 3/2018 | Auh | H04L 9/14 |
| 2018/0307859 A1 * | 10/2018 | LaFever | H04L 63/20 |
| 2019/0207756 A1 * | 7/2019 | Vass | H04L 9/0863 |
| 2019/0332807 A1 * | 10/2019 | LaFever | H04L 63/0407 |
| 2020/0320039 A1 * | 10/2020 | Manningham | H04L 9/0643 |
| 2022/0050921 A1 * | 2/2022 | LaFever | H04L 63/20 |
| 2022/0164324 A1 * | 5/2022 | Goel | G06F 21/6218 |
| 2022/0164873 A1 * | 5/2022 | Goel | G06F 16/22 |
| 2022/0253555 A1 * | 8/2022 | Chopra | G06Q 30/0242 |
| 2022/0284127 A1 * | 9/2022 | Levy | H04L 9/085 |
| 2023/0054446 A1 * | 2/2023 | LaFever | H04W 12/75 |

* cited by examiner

*Primary Examiner* — Oleg Korsak
(74) *Attorney, Agent, or Firm* — LOEB & LOEB LLP

(57) ABSTRACT

A system and method may facilitate data matching between multiple data owners through the use of a common set of "pseudonymized" individuals or household identifiers without requiring any data owner to share personally identifiable information with any other party. Data owners may accurately match ID-level online and offline data across multiple platforms with other participants' online and offline data without requiring any party to disclose personally identifiable information about their users or households. This use of deterministic data, rather than probabilistic data or a combination of deterministic and probabilistic data, is more accurate while also lowering the risk of data breach since no personally identifiable information is shared. Likewise, match processing time is greatly reduced through automation in a permissioned peer-to-peer network where each peer pseudonimizes its customer data with a universal or household ID to facilitate data matching with similarly pseudonimized customer data of other peers.

16 Claims, 5 Drawing Sheets

SYSTEM AND METHOD FOR ANONYMOUS DATA SHARING AMONG NODES OF A PRIVATE DATA NETWORK

FIELD OF TECHNOLOGY

The present disclosure generally relates to data security in private networks and, specifically, to creating a universal identification for use within a private data network without requiring data owners to disclose personally identifiable information about their users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Targeted advertising to consumers relies on precise gathering and tracking of sensitive and private information. In order to facilitate targeted advertising and provide accurate media measurement, media companies and advertisers need to match various first and third party data sets. One example of first and third party data set analysis for targeted advertising may include matching target audience segments to the appropriate subscribers or viewers in order to facilitate personalized addressable advertising as well as accurately correlating the appropriate advertising exposure/impression and viewing data to the correct person or household for measurement analysis across media distribution platforms.

However, targeted advertising may also emphasize conflicting goals for companies and their customers. Companies want to use data related to their customers' lifestyle, demographics, online habits, and other information to provide them with the most useful information about their products and services. However, customers are reluctant to share their information without fully understanding how consent to personal data monitoring and gathering might influence their actions and sense of security. Often, even with their explicit consent, customers may feel that this monitoring is an invasion of privacy especially when the resulting data may be personally identifiable.

Companies may desire: 1) matching target audience segments to appropriate subscribers or viewers in order to facilitate personalized addressable advertising, and 2) accurately correlating the appropriate advertising exposure or impression to the correct person or household for measurement analysis across media distribution platforms. At the same time, data owners and media companies must preserve consumers' privacy by limiting the disclosure of personally identifiable information. Increasingly, legislation may limit companies' use of personal data, as well.

Typically, browser cookies and device identification methods have been shared between third parties for targeted marketing. Also, companies have used trusted third party on-boarders to receive identifiable information from various data owners in order to perform household, device or individual data matching. Subsequent provisioning of synthetic consumer IDs to data providers by these third party on-boarders facilitates data matching between parties.

Browser identifiers (e.g., cookies) or device identifiers (e.g., Media Access Control or MAC IDs, Mobile Device IDs, etc.) are provisioned by the device maker. However, these IDs are only applicable to activity on a particular device or browser. For multiple third parties to match data across various devices and browsers with one another requires a device or identity graph capable of mapping identifiers to a given user or household. Device and identity graphs include various statistical and probabilistic methods for data matching that include some degree of error. Additionally, when these methods assign universal identifiers, these IDs may be accessible across many companies without user consent. Device manufacturers with an interest in preserving their hold on customers' data may also steer customers toward their own data services with the stated interest of preserving user privacy.

Using a trusted third party for personal data onboarding or crosswalk approaches may require data owners to send their users' personally identifiable information to the service. With trusted third parties, data owners must rely on the third party to manage the data security and protect the privacy of their users via a combination of processes, protocols and contractual commitments. These third parties, who process significant amounts of data, are thus responsible for safe guarding data security and user privacy. If the third party's data is breached, however, the user data could be re-identified. Such a breach would significantly tarnish the reputation of the data owner. Also, match reconciliation where two data-matching customers do not have the same identifier will be readily recognized. Since the third party processes data reconciliation, this data-matching procedure may last days and even weeks.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

Nodes of a private, cloud-based, peer-to-peer network may determine which of their customers are also customers of other network nodes. The network may combine data normalization, advanced cryptography, and private and shared databases with access controls with a process for ensuring data owners can work with other customers on the network.

A method and system may balance the competing interests of companies and consumers by allowing multiple data owners to match data with one another accurately through the use of a common set of anonymous or "pseudonymized" individuals using household identifiers without requiring any data owner to share personally identifiable information with another party, including a trusted third party onboarding partner. Data owners may accurately match ID-level online and offline data across multiple platforms with other participants' online and offline data without requiring any party to disclose personally identifiable information about their users or households. This use of deterministic data, rather than probabilistic data or a combination of deterministic and probabilistic data, is more accurate while also lowering the risk of data breach since no personally identifiable information is shared. Likewise, match processing time is greatly reduced through automation.

In some embodiments, a processor-implemented method may share customer data among nodes of a private, cloud-based, peer-to-peer network without disclosing personally identifiable data of the customer data. The method may include processor-executable instructions to normalize an identification attribute for both a first customer data corresponding to a first node of the private, cloud-based, peer-to-peer network and one or more sets of second customer data that each correspond to one or more second nodes of the private, cloud-based, peer-to-peer network, where each set of first or second customer data corresponds to one Household ID, as further described, herein. In other words, one Household ID corresponds (i.e., identifies) at least one set of customer data. Multiple customers may have the same identification element (e.g., multiple customers living at a single street address, sharing a phone number, an IP, or other identification element). Identification elements of normalized customer data may be hashed and salted to output a unique household identification for each customer of the first customer data 124A and second customer data 154A, respectively, in a one-to-one or one-to-many correspondence. The processor-executable instructions may also insert a salting file within the normalized identification attribute to create a salted identification and hash the salted identification to create a hashed identification corresponding to both the first customer data and the second customer data. In response to a matching request from the first node to one or more second nodes, the matching request including the hashed identification corresponding to the first customer data, the method may then match the hashed identification corresponding to the first customer data with the hashed identification corresponding to the one or more sets of second customer data, and send the matched hashed identification to the first node of the private, cloud-based, peer-to-peer network. Further embodiments may also deduplicate the matched Household ID(s) such that only one copy of the matched Household ID is returned to the requestor in response to the data matching request despite the possibility that several Household IDs across all network members or that several sets of customer data may correspond to a single Household ID of the matching request.

In further embodiments, a system may share customer data among particularly-configured nodes of a private, cloud-based, peer-to-peer network without disclosing personally identifiable data of the customer data. The system may include a processor and a memory for storing processor-executable instructions. Execution of the instructions may normalize an identification attribute for both a first customer data corresponding to a first node of the private, cloud-based, peer-to-peer network and one or more sets of second customer data that each correspond to one or more second nodes of the private, cloud-based, peer-to-peer network, where each set of first or second customer data corresponds to one Household ID, as further described, herein. In other words, one Household ID corresponds (i.e., identifies) at least one set of customer data. Multiple customers may have the same identification element (e.g., multiple customers living at a single street address, sharing a phone number, an IP, or other identification element). Identification elements of normalized customer data may be hashed and salted to output a unique household identification for each customer of the first customer data 124A and second customer data 154A, respectively, in a one-to-one or one-to-many correspondence. Instruction execution may also insert a salting file within the normalized identification attribute to create a salted identification and hash the salted identification to create a hashed identification corresponding to both the first customer data and the second customer data. In response to a matching request from the first node to one or more second nodes, the matching request including the hashed identification corresponding to the first customer data, execution of the instructions may match the hashed identification corresponding to the first customer data with the hashed identification corresponding to the one or more sets of second customer data, and send the matched hashed identification to the first node of the private, cloud-based, peer-to-peer network Further embodiments may also deduplicate the matched Household ID(s) such that only one copy of the matched Household ID is returned to the requestor in response to the data matching request despite the possibility that several Household IDs across all network members or that several sets of customer data may correspond to a single Household ID of the matching request.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

A method and system may balance the competing interests of companies and consumers by allowing multiple data owners to match data with one another accurately through the use of a common set of "pseudonymized" individuals or household identifiers without requiring any data owner to share personally identifiable information with any other party. Data owners may accurately match ID-level online and offline data across multiple platforms with other participants' online and offline data without requiring any party to disclose personally identifiable information about their users or households. This use of deterministic data, rather than probabilistic data or a combination of deterministic and probabilistic data, is more accurate while also lowering the risk of data breach since no personally identifiable information is shared. Likewise, match processing time is greatly reduced through automation.

Some embodiments may include a permissioned peer-to-peer network where each peer pseudonimizes its customer data with a universal or household ID to facilitate data matching with similarly pseudonimized customer data of other peers. For example, software may be deployed within each data owner's owned or controlled cloud account infrastructure (e.g., Amazon Web Services®, Microsoft Azure®, Google Compute Engine®, etc.). Once installed, this software performs all functions to match customers' Household IDs to customer data attributes desired by the network member without needing to share personally identifiable information with a third party processor.

Figure 1:
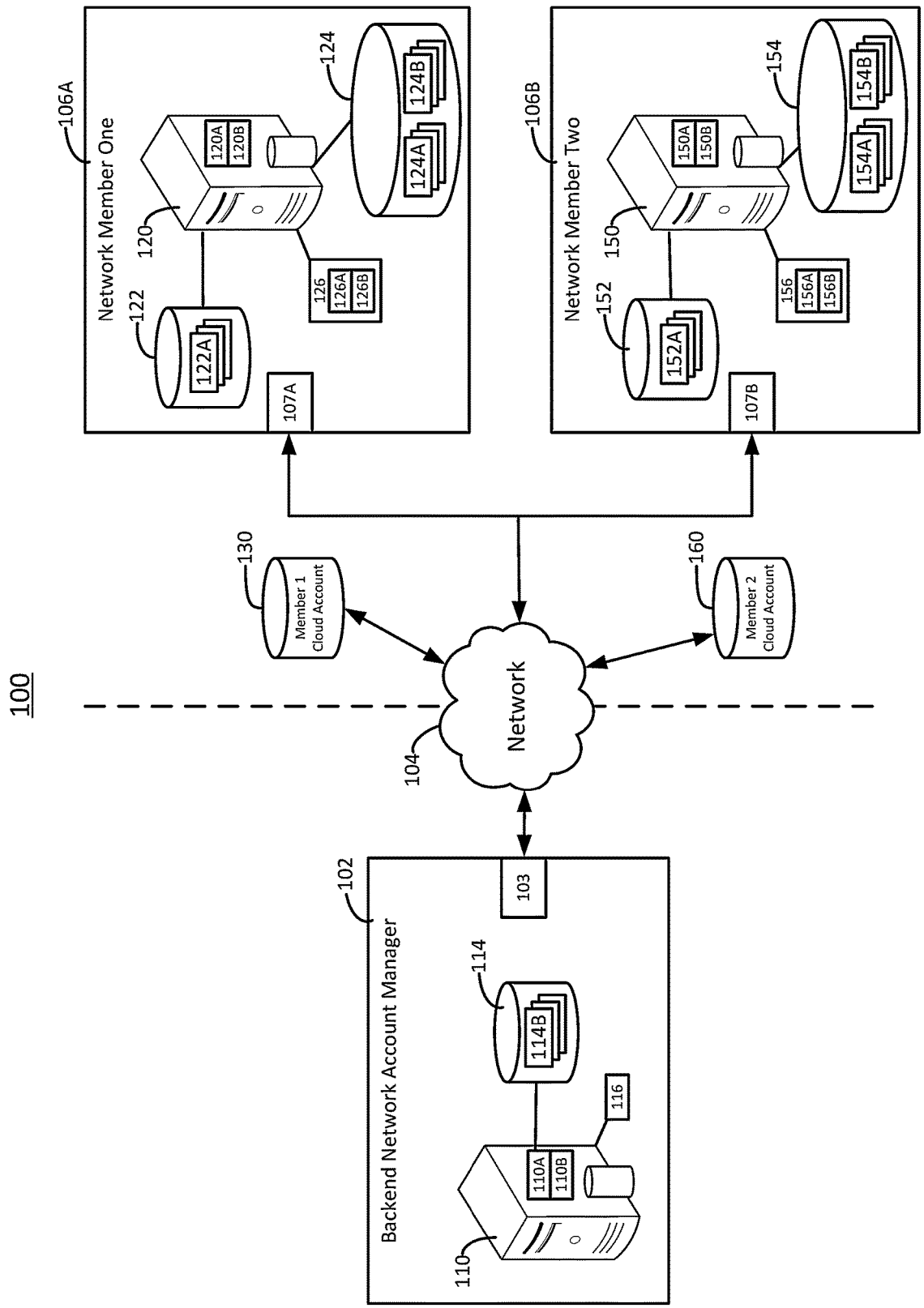
FIG. 1 illustrates a system for a private, peer-to-peer data network.

FIG. 1 generally illustrates a system 100 that is managed by a backend network account manager 102 for creating a Household ID for use within a private, peer-to-peer data network 104 without requiring network members 106A, 106B to disclose personally identifiable information (PII) about their users. The backend network account manager 102 and network members 106A, 106B may be in communication with each other via the network 104 or communication link (e.g., computer network, internet connection, etc.). Each of the entities 102, 106A, 106B may respectively include a gateway 103, 107A, 107B or other connection between networks that use different protocols, addressing schemes, or communication technologies. Each gateway 103, 107A, 107B may also include security features (e.g., SSL certificates, security policies, filters, etc.) to facilitate data transfer, provide security, and help manage network traffic efficiently between the entities 102, 106A, 106B. While the system 100 shown in FIG. 1 includes two network members 106A, 106B, these are for illustration only and the system may include any number of entities including many that are identical or similar in structure and function to the network members 106A and 106B, as described herein and as known in the art. Likewise, any elements and functions described in relation to only network member 1 (106A) may also be part of network member 2 (106B) and vice versa.

The system 100 may include various software or computer-executable instructions and specialized hardware components or modules for creating and facilitating the use of household identifications. The various modules may be implemented as computer-readable storage memories containing computer-readable instructions (i.e., software) for execution by a processor of the computer system 100 within a specialized or unique computing device. The modules may perform the various tasks associated with creating and using a Household ID and other functions as described herein. The computer system 100 may also include both hardware and software applications, as well as various data communications channels for communicating data between the various specialized or unique hardware and software components.

A backend network account manager 102 may include a backend network account manager server 110 including a network account manager processor 110A and a network account manager memory 110B. The memory 110B may store processor-executable software and instructions (e.g., an account manager application 116) for receiving hashed identification data including a primary or "household" identification (e.g., physical mailing address) and a secondary or "owner" identification (e.g., a mailing address including the owner's name, phone number, or other data that uniquely identifies a network member 106A, 106B) from network members 160A, 106B. The account manager application 116 may also include processor-executable software and instructions for maintaining a hashed identification database 114 including the hashed identification data 114B received at the backend network account manager 102, and instructions for deduplicating the hashed identification data 114B when more than one network member includes customer data corresponding to the same Household ID as one or more other members. The hashed identification data 114B may include a Household ID, as described herein.

A first network member 106A may include first network member server 120 including a first processor 120A and first memory 120B and the second network member 106B may include second network member server 150 including a second processor 150A and second memory 150B. The respective memories 120B, 150B may store processor-executable software and instructions for matching "pseudonimized" customer data. For example, a Household ID 124B corresponding to first customer data 124A may be matched to a Household ID 158B corresponding to second customer data 154A and/or matched to other Household IDs corresponding to other Network Members). Matching among the network members may allow the members to send targeted marketing data 122A to their customers based on the match or matches without requiring any party to disclose PII about their customers. The first network member 106A may include a first private data application 126 and the second network member 106B may include a second private data application 156 that both include processor-executable instructions for execution by respective processors 120A, 150A. While the embodiments shown in FIG. 1 show two network members (106A, 106B, the system 100 may include any number of network members (or nodes). Typically, a requesting node will include many of its Household IDs in its matching query to other nodes. For example, in some embodiments, a first network member 106A may include the memory 120B with processor-executable instructions for sending a request to match one or more of Network Member One's 106A Household IDs 124B to other network members' Household IDs. This matching permits network members to gain insight into their own customers by determining which of their customers are also customers of other network members without requiring the network members to disclose PII about its customers to other network members. A second network member 106B, or any other network member (not shown) may also include the memory 150B with processor-executable instructions for matching its Household IDs 154B to other network members' Household IDs. In further embodiments, the backend network account manager 102 may include the memory 110B including processor-executable instructions for matching Household IDs among network members. The first private data application 126 and second private data application 156 may also include processor-executable instructions to allow each network member 106A, 106B interact with the backend network account manager 102 over the private peer-to-peer network 104. Each application 126, 156 may include processor-executable instructions to install cloud infrastructure that allows data to be hashed in servers controlled by the data owner through their own cloud account (e.g., Amazon Web Services®, Microsoft Azure®, Google Compute Engine®, etc.) 130, 150 to create Household IDs 124B, 154B for their customers and to match their Household IDs with other members' Household IDs.

The embodiments include systems and methods combining data normalization, advanced cryptography, and private and shared databases with access controls. These elements ensure data owners can work with other customers on a peer-to-peer basis who have committed to following all applicable data privacy and security laws and regulations. For example, some embodiments of the first private data application 126 and the second private data application 156 may include processor-executable instructions for data normalization (i.e., standardization of mailing addresses to an agreed-upon format or structure), pseudonymization (encryption/hashing of personally identifiable identifiers such as mailing address), and provisioning of household identifications on a permissioned basis for approved network participants. Additionally these household identifications can be removed in accordance with user opt-outs from a central database administrator. The first private data application 126 and the second private data application 156 may also include processor-executable instructions for installing a required application software and cloud infrastructure to hash data in servers controlled by the data owner (i.e., member 1 cloud account 130, member 2 cloud account 160).

The first private data application 126 and the second private data application 156 may also include processor-executable instructions for standardizing or normalizing customer data within each member's customer data repository (e.g., first customer data 124A within the first customer data repository 124, second customer data 154A within the second customer data repository 154, etc.) before the system 100 initiates encryption-based hashing of the first customer data 124A within the first customer data repository 124, second customer data 154A within the second customer data repository 154, etc. For example, instructions of the first private data application 126 and the second private data application 156 may compare an identifier within respective first customer data 124A and second customer data 154A to a truthset database or address validation application programming interface (API) for normalization. Examples of a truthset or address validation API may include SmartyStreets®, PostGrid®, Radar®, EasyPost®, etc. The first private data application 126 and the second private data application 156 may also include processor-executable instructions for a normalization rules engine to check for common errors within the customer data 124A, 154A so that address identifiers can be cleansed before being hashed. Standardization/normalization helps ensure that for any given address input by two separate data owners, the same output hash will result even if one the data owners had slightly different formats (e.g., One wrote "123 $3^{rd}$ ST, BROOKLYN NY 11215" and the other wrote "123 $3^{rd}$ Street, BROOKLYN NY 11215").

The first private data application 126 and the second private data application 156 may also include processor-executable instructions for a hashing function 126A, 156A with a secret salt file 126B, 156B, respectively. The instructions may hash and salt one or more identification elements of the normalized customer data 124A, 154A to output a unique household identification 124B, 154B for each customer of the first customer data 124A and second customer data 154A, respectively, in a one-to-one or one-to-many correspondence. For example, one household identification 124B may correspond to customer data 124A corresponding to one customer or more than one customer for the hashed and salted identification element. That is, the household identification 124B, 154B may correspond to one or several customers at a single street address, phone number, or other identification element.

Hashing functions may include a Password Based Key Derivation Function (e.g., PBKDF2) or any other cryptographic method to ensure that the output (i.e., Household IDs) is unique even if the input passwords are not. Each data owner (i.e., Network Member 1, Network Member 2, etc.) must apply the same hash to ensure that physical addresses of the customer data 124A, 154A can be matched to the same Household ID. The hashing function is consistent across data owners and includes protections that mitigate the risk of dictionary or rainbow attacks from a bad actor. For example, a function such as PBKDF2 is computationally expensive and infeasible to attempt such attacks. Prior to executing the hashing function, the first private data application 126 and the second private data application 156 may also include processor-executable instructions for inserting a secret "salting" file that is not accessible to the end-user of the software.

Each member's server (e.g., 120, 150) may communicate with the backend network account manager 102 over a private peer-to-peer network (e.g., network 104) and via gateways 103, 107A, 107B to share the output of each hash of the first customer data 124A and second customer data 154A (e.g., a hashed mailing address). For example, the account manager application 116 may include processor-executable instructions to compare a hashed mailing address for data owner one to the hashed identification data 114B of the hashed identification database 114 to check if such hashed record exists. If so, the matching Household ID is returned, and data owner one is marked as an additional contributor of this Household ID along with a timestamp and other relevant metadata. If not, the backend network account manager server 110 may execute processor-executable instructions of the account manager application 116 to create a new Household ID 124B, 154B based on the hashed mailing address for data owner one and also create an indication in the corresponding hashed identification data 114B that data owner one is the sole contributor of this Household ID along with a timestamp and other relevant metadata.

The first private data application 126 and the second private data application 156 may also include processor-executable instructions and one or more data structures to further improve match rates with other data owners. In some embodiments, the instructions may store private data identities (e.g., first customer data 124A, second customer data 154A, etc.) or device graphs in its own cloud account (130, 160, respectively) as a series of PBKDF2 hashes for IP Addresses, Emails, etc., along with the system-wide universal Household ID and its own proprietary identification for each Record ID of the customer data 124A, 154A. This will allow the data owner to match its data with other data owners based on either the Household ID (as derived from a hashed and salted mailing address) or conversely, based on the hashes of other identifiers such as IP Address, Emails, phone numbers, etc.

Figure 2A:
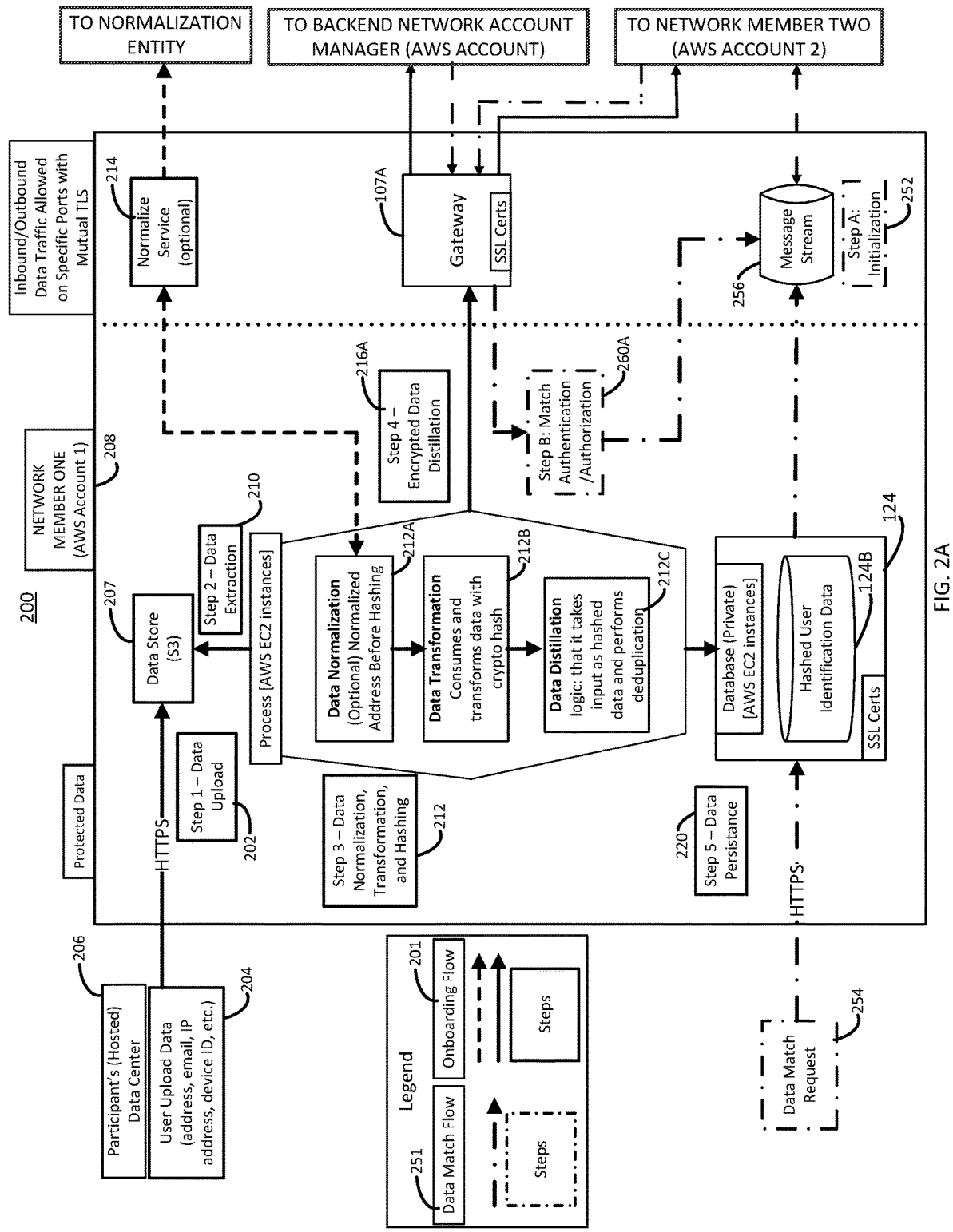
FIGS. 2A and 2B illustrate an example data flow across nodes of a private, peer-to-peer data network.
Figure 2B:
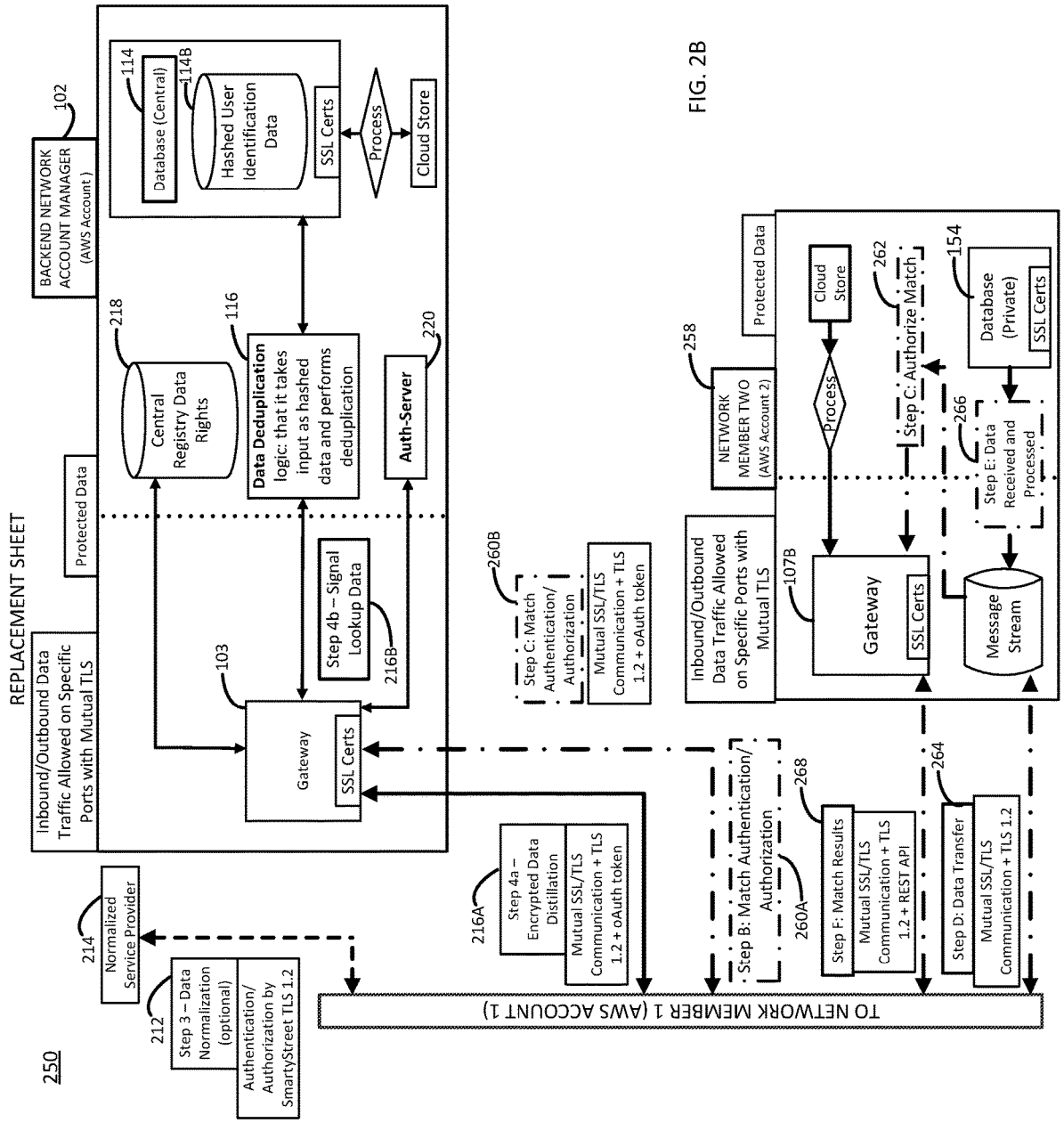

With reference to FIGS. 2A and 2B, a method 200, 250 may increase data security in private networks and, specifically: 1) create a universal household identification for use within a private data network without requiring data owners to disclose personally identifiable information about their users; and 2) match "pseudonomized" user data across data owners so that data owners may facilitate personalized addressable advertising as well as accurately correlating the appropriate advertising exposure/impression and viewing data to the correct person or household for measurement analysis across media distribution platforms. FIGS. 2A and 2B illustrate data flows for a computer-implemented method 200, 250 for completing one or more processes within the system 100. Each step of the methods 200, 250 is one or more processor-executable instructions (e.g., control signals, modules, blocks, stand-alone instructions, etc.) performed on a processor of a server or other computing device which may be physically configured to execute the different aspects of the methods 200, 250. The method steps may be executed remotely at a hosted or controlled cloud account infrastructure (e.g., Amazon Web Services®, Microsoft Azure®, Google Compute Engine®, etc.) or locally at each network member's own infrastructure. Each step may include execution of any of the instructions as described in relation to the system 100, 200, 250 as part of the "pseudonomization" of customers' personally identifiable information (PII). The network may combine data normalization, advanced cryptography, and private and shared databases with access controls with a process for ensuring data owners can work with other customers on the network. While the below blocks are presented as an ordered set, the various steps described may be executed in any particular order to complete the methods described herein.

In an onboarding process 201 beginning at 202, a user 204 may upload its personally identifiable information (PII) to a participant's hosted data center 206. For example, a user 204 may upload PII such as an address, email, IP address, device ID, etc., to a data store 207 managed by a participant 208 (e.g., Network Member One 106A or Network Member Two 106B, etc.). The data center may be hosted by Amazon Web Services®, Microsoft Azure®, Google Compute Engine®, etc. Via https or other secure computer communication protocol, the PII may be uploaded as an object as in Amazon® Simple Storage Service (Amazon S3®), or other scalable data store. At 210, data may be extracted from an instance of the PII that was uploaded to the data store 207. For example, the method 200 may extract individual addresses, emails, IP addresses, device IDs, etc., from the PII object instance.

At 212, the extracted data from 210 may be processed. In some embodiments, processor-executable instructions may normalize, transform, hash, and deduplicate the extracted data. For example, at 212A, the extracted data may be normalized by a normalization entity 214 (FIGS. 2A and 2B) such as SmartyStreets®, PostGrid®, Radar®, EasyPost®, etc. As described above in relation to the first and second private data applications 126, 156, a normalization rules engine of the normalization entity 214 and/or one or more of the account manager application 116, the first or second private data applications 126, 156, etc., may check for common errors within the customer data 124A, 154A so that address identifiers can be cleansed before being hashed. Further, at 212B, the method 200 may consume and transform the normalized and extracted data with a cryptographic hash. In some embodiments, 212B may include processor-executable instructions to perform a hash function on one or more elements of a customer's PII. The hash function may be performed a set number of times (e.g., 500 times) for added security. The hash function may include a Password Based Key Derivation Function (e.g., PBKDF2) or any other cryptographic method to ensure that the output (i.e., a Household ID 124B, 154B) is unique even if the input passwords are not. Each data owner (i.e., Network Member 1, Network Member 2, etc.) must apply the same hash to ensure that a selected identifier (e.g., physical addresses of the customer data 124A, 154A) can be matched to the same Household ID 124B, 154B, respectively.

The extracted data from 210 may also be distilled as part of processing at 212C. In some embodiments, the first or second private data applications 126, 156, may include processor-executable instructions to deduplicate an output of the processor-executable instructions of 212B, i.e., a Household ID, and determine if the same Household ID already exists in one or more data repositories of the system 100. For example, at 216A, processor-executable instructions may send a Household ID 154B to the backend network account manager 102 via gateway 107A where processor-executable instructions of the account manager application 116 (FIGS. 1, 2B) may perform a data lookup at 216B via data from a central data rights registry 218 as processed using processor-executable instructions at an authorization server 220 and determine whether the Household ID 124B created from customer data 124A of Network Member One 106A is a duplicate of an existing Household ID data 124B of the first customer data repository 124. At 220, processor-executable instructions of the account manager application 116 may store the Household ID 124B in the first customer data repository 124. The data onboarding process 201 may then be complete.

Once the local and/or remote processor-executable instructions of the first private data application 126, the second private data application 156, and the account manager application 116 complete the data onboarding process 201 (i.e., Network Members 106A, 106B create Household IDs 124B, 154B for each set of customer data 124A, 154A, respectively, and store the Household IDs 124B, 154B as hashed identification data 114B in the hashed identification database 114), the method 200, 250 may begin a data matching process 251. The data matching process 251 may include processor-executable instructions for using the Household IDs 124B, 154B to match target audience segments to appropriate subscribers or viewers in order to facilitate personalized addressable advertising, and accurately correlate the appropriate advertising exposure or impression to the correct person or household for measurement analysis across media distribution platforms.

At 252, in response to a data match request 254 from one network member to another (e.g., from Network Member One 208 to Network Member Two 258 and/or other network nodes) via a user interface (e.g., graphical user interface 308 of FIG. 3), processor-executable instructions may initialize a data match process 251 over a secure computer communication protocol. In some embodiments, processor-executable instructions may initiate a message stream between the network members 208, 258. In further embodiments, processor-executable instructions may initiate a message stream 256 with one or more other network members and/or a Backend Network Account Manager 102 in parallel. For example, the message stream 256 may connect with a gateway 103 of the Backend Network Account Manager 102 directly or indirectly via the gateway 107B. The data match request 254 may include one or more Household IDs 124B (hashed and salted IP addresses of Network Member One customers, for example) that correspond to first customer data 124A. Network Member Two 258 may then match those received Household IDs 124B to its own set of Household IDs 154B. In response to the data match request 254, Network Member Two may then return a set of its Household IDs 154B that match those Household IDs 124B it received from Network Member One. Network Member One may then resolve those received Household IDs to its first customer data 124A and use that overlapping data in a targeted marketing campaign, product planning, creating an optimized set of customers, (i.e., first marketing data 122A from a first marketing data repository 122), etc. In some embodiments, the requester (Network Member One 208) accesses a user interface (e.g., graphical user interface 308 of FIG. 3) to view and select various customer data attributes from the first customer data 124A and compile a list of Household IDs 124B corresponding to those customer data attributes. That compiled list of Household IDs 124A may then be used with other network members to determine overlap. Initialization 252 may include processor-executable instructions to queue the Household IDs 154B in the data match request 254 for matching to the second customer data 154A and the various first marketing data 122A. In some embodiments, initialization 252 may employ a streaming system (e.g., Kafka®, Solace®, Redpanda®, etc.) to process the match request.

At 260A, processor-executable instructions may initiate a match authentication and authorization process between requesting network member (i.e., Network Member One) and the backend network account manager 102. In some embodiments, 260A includes processor-executable instructions to access one or more of a central data rights registry 218 and an authorization server 220 of the backend network account manager 102 via a secure gateway 103. The data match request 254 may include data that processor-executable instructions of the authorization server 220 use to authenticate and authorize the data match request of the requesting entity based on further data of the central data rights registry 218. For example, the data match request 254 may include data that authenticates the identity of the network member that sent the data match request 254 (i.e., Network Member One 208) to create an encrypted communication link between the requester (Network Member One 208) and the receiver (Network Member Two 258). The data match request 254 may also include data that allows the network member that initiates the data match request (Network Member One 208) to authenticate the request sender with another entity (Backend Network Account Manager 102). In some embodiments, the data match request 254 includes a Secure Sockets Layer (SSL) certificate.

At 260B, processor-executable instructions send the match authentication/authorization results to the request receiver (Network Member Two 258) via gateway 107B and, at 262, match the Household IDs 124B of the data match request 254 to its own Household IDs 154B. In some embodiments, the processor-executable instructions include rules for a segment-sharing service that allows for Network Member One 208 and Network Member Two 258 to exchange segment data in a secure, governed, and privacy-friendly manner. Some examples of segment-sharing services include Adobe® Experience Platform Segment Match®, Twilio Segment®, Informatica® MDM®, etc.

At 264, processor-executable instructions may deduplicate and transfer or send an indication of Household IDs 154B that matched the Household IDs 124B of the data match request 254 to the data requester (Network Member One) cloud account. In further embodiments, processor-executable instructions of the request recipient may deduplicate the match by removing those Household IDs from the data match request 254 that are not also present in the recipient's own customer data repository 154A. At 266, processor-executable instructions may receive acknowledgement that the requesting entity (Network Member One 208) received and processed the transferred/sent Household IDs 154B. At 268, processor-executable instructions may communicate an indication of the match results sent at 264 to the user interface (e.g., graphical user interface 308 of FIG. 3) from which the entity (Network Member One 208) initiated the data match request 254.

Figure 3:
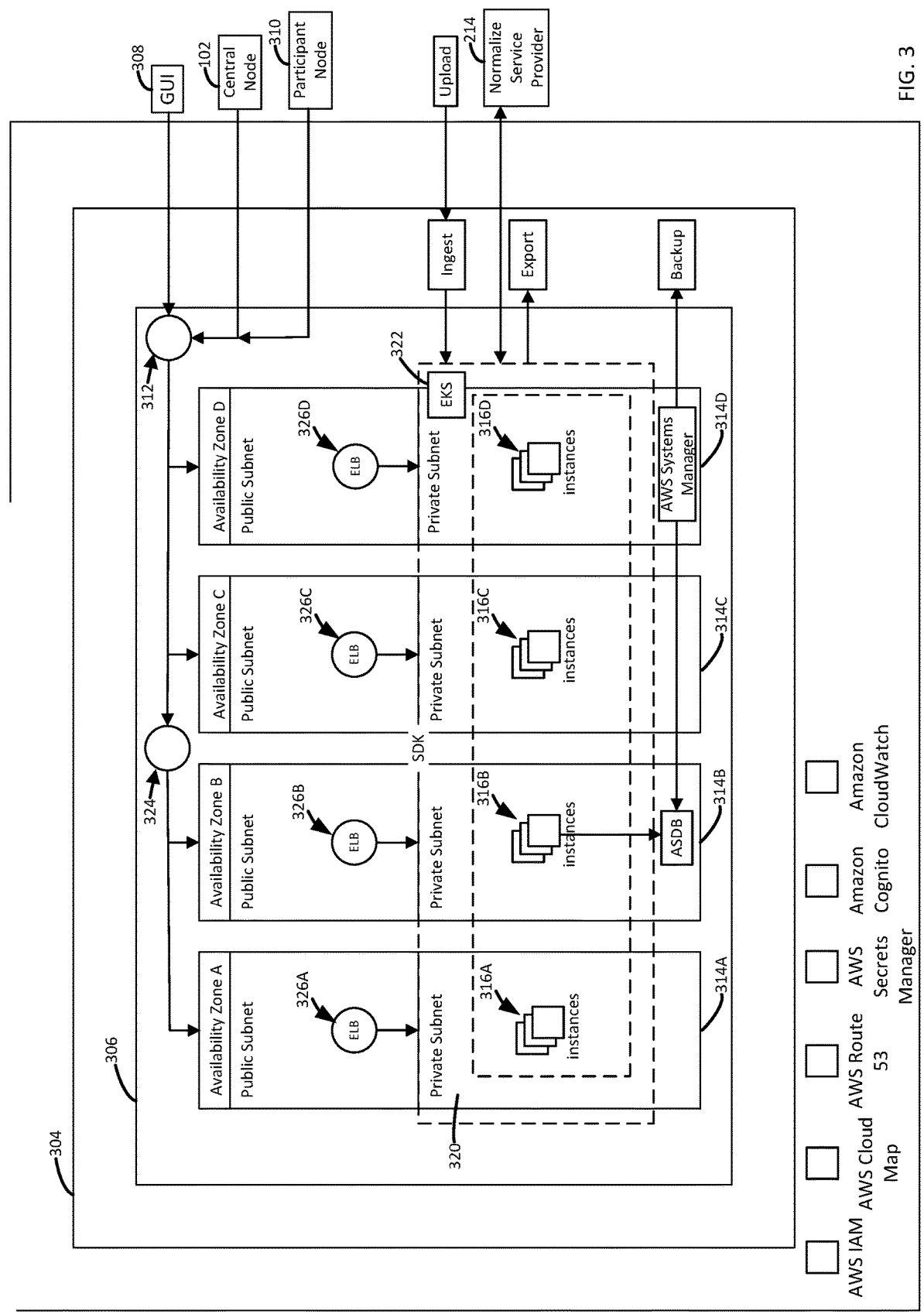
FIG. 3 illustrates an example node of a private, peer-to-peer data network.

With reference to FIG. 3, each network member (208, 258, etc.) may include various processes, data structures, processor-executable instructions, and network connections with other elements of the system (100, 200, 250, etc.) to facilitate the embodiments described herein. The example network member 300 of FIG. 3 may be deployed within each data owner's owned or controlled cloud account infrastructure (e.g., Amazon Web Services®, Microsoft Azure®, Google Compute Engine®, etc.). Once installed, the network member 300 may perform all functions to match to a household identifier without needing to share personally identifiable information with a third party processor.

The network member 300 may be deployed within a cloud account infrastructure 302. A security layer 304 may control which traffic is permitted to enter and exit a virtual private cloud 306. In some embodiments, the security layer 304 includes a virtual firewall such as a VM-Series® by Palo Alto Networks®, SonicWall® NSA, Cisco® ASA® Firewall, etc. The systems and functions of each network member 300 may be deployed within the cloud account infrastructure 302 as a virtual private cloud (VPC) 306. The VPC may include network communication and access to the Backend Network Account Manager 102 via a web-based graphical user interface (GUI) 308 to select and/or display various desired customer data attributes as described herein. Access to the GUI 308, Backend Network Account Manager 102, and other network members 310 may be controlled by an internet gateway 312. As previously described, each Household ID may correspond to a containerized "household" (314A, 314B, 314C, 314D) that each includes one or more instances of customer data (316A, 316B, 316C, 316D). Each of the households 314A, 314B, 314C, 314D may include a public subnet 318 and a private subnet 320 that includes processor-executable instructions to control access to data manages by each household 314A, 314B, 314C, 314D. The private subnets 320 of the network member 300 may manage workloads and services by a portable, extensible, platform 322 that facilitates both declarative configuration and automation. In some embodiments, the platform 322 includes a Kubernetes Service and, collectively, the households 314A, 314B, 314C, 314D include a Kubernetes cluster. Network traffic from the internet gateway 312 to each household 314A, 314B, 314C, 314D may be managed by a network load balancer 324. Network traffic from the network load balancer 324 to each private subnet 320 may be managed by an elastic load balancer 326A, 326B, 326C, 326D.

The methods and systems described herein may balance the competing interests of companies and consumers by allowing multiple data owners to match data with one another accurately through the use of a common set of "pseudonymized" individuals or household identifiers without requiring any data owner to share personally identifiable information with any other party. Data owners may accurately match ID-level online and offline data across multiple platforms with other participants' online and offline data without requiring any party to disclose personally identifiable information about their users or households. This use of deterministic data, rather than probabilistic data or a combination of deterministic and probabilistic data, is more accurate while also lowering the risk of data breach since no personally identifiable information is shared. Likewise, match processing time is greatly reduced through automation in a permissioned peer-to-peer network where each peer pseudonimizes its customer data with a universal or household ID to facilitate data matching with similarly pseudonimized customer data of other peers.

Figure 4:
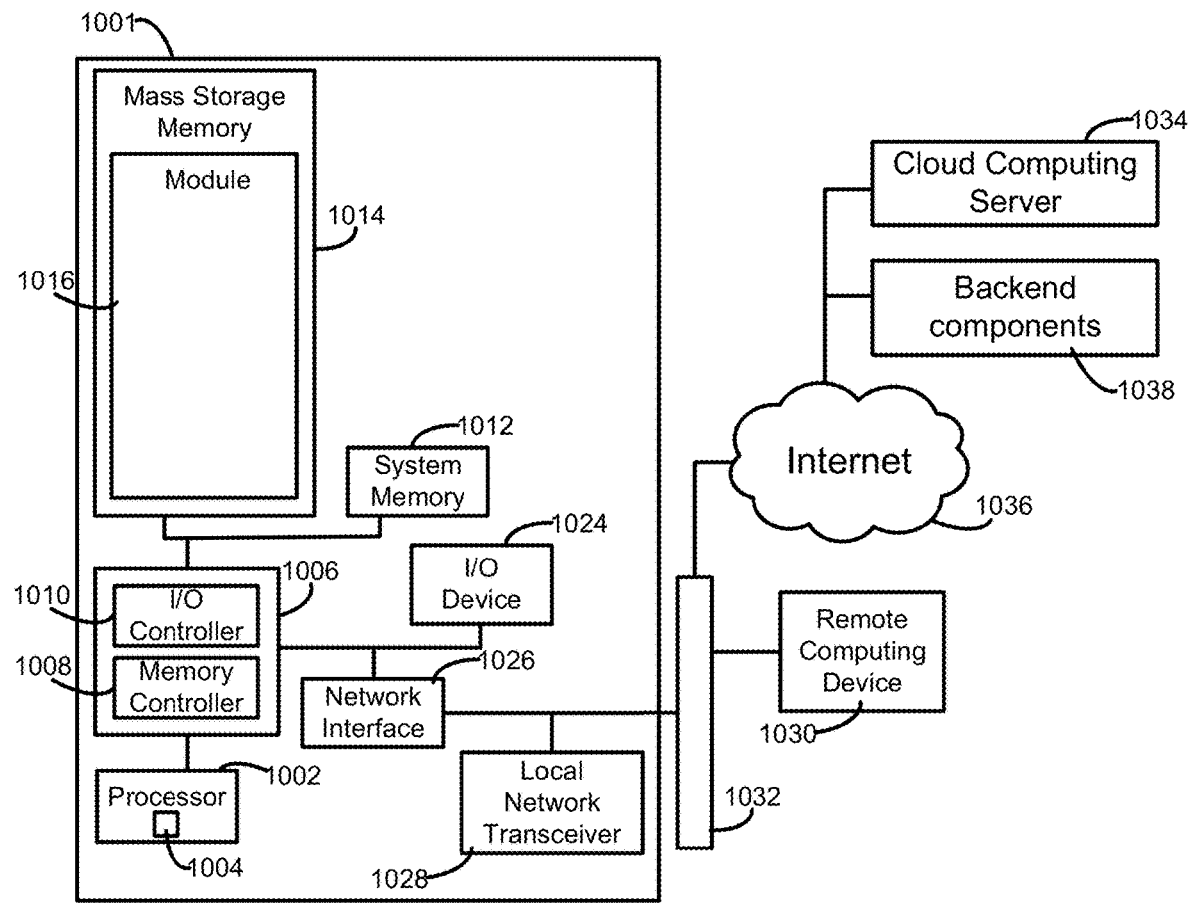
FIG. 4 illustrates an exemplary computing device used within the private, peer-to-peer data network system to implement the various processor-executable instructions, algorithms, process flows, or methods described herein.

FIG. 4 is a high-level block diagram of an example computing environment 1000 for the systems and methods described herein. The computing device 1001 may include a server, a network member computing device, a customer computing device, a cellular phone, a tablet computer, a Wi-Fi-enabled device or other personal computing device capable of wireless or wired communication, a thin client, or other known type of computing device. As will be recognized by one skilled in the art, in light of the disclosure and teachings herein, other types of computing devices can be used that have different architectures. Processor systems similar or identical to the example systems and methods may be used to implement and execute the example systems illustrated in the figures. Although the example system 1000 is described below as including a plurality of peripherals, interfaces, chips, memories, etc., one or more of those elements may be omitted from other example processor systems used to implement and execute the example systems across multiple computer network devices and channels. Also, other components may be added.

As shown in FIG. 4, the computing device 1001 includes a processor 1002 that is coupled to an interconnection bus. The processor 1002 includes a register set or register space 1004, which is depicted in FIG. 4 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 4, the computing device 1001 may be a multi-processor device and, thus, may include one or more additional processors that are identical or similar to the processor 1002 and that are communicatively coupled to the interconnection bus.

The processor 1002 of FIG. 4 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, if the computing device 1001 is used to implement a module 1016 (e.g., the various processor-executable instructions herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001 and the system 100. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028, (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the backend components of the system 100 and perform any operations related to the methods as described herein. The local network transceiver 1028 may include support for a Wi-Fi network, Bluetooth, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 4 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a Java® applet executing within a Java® Virtual Machine (JVM) environment resident in the computing device 1001 or the remote computing device 1030. In some embodiments, the module 1016 may communicate with back end components 1038 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 4 to simplify and clarify the description, it is understood that any number of client computers are supported and can be in communication within the system 1000.

Additionally, certain embodiments are described herein as including logic or a number of components, modules, or mechanisms. Modules may constitute either software modules (e.g., code or instructions embodied on a machine-readable medium, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations or "blocks" as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for sharing customer data among nodes of a private, cloud-based, peer-to-peer network without disclosing personally identifiable information of the customer data, the method comprising:
   normalizing an element of personally-identifiable information (PII) for each first customer data at a first node and each second customer data at a second node of the private, cloud-based, peer-to-peer;
   hashing the normalized PII element to create a hashed identification for each first customer data at a first node and each second customer data at a second node of the private, cloud-based, peer-to-peer network, wherein each unique to hashed identification corresponds to a unique household identification;
   in response to: 1) receiving one or more hashed identifications or one or more household identifications from the first node at the second node, and 2) matching the one or more hashed identifications from the first node to one or more hashed identifications at the second node or matching the one or more household identifications from the first node to one or more household identifications at the second node:
      sending, from the second node to the first node, one or more of: 1) a count of household identifications that correspond to the one or more matched, hashed identifications and 2) the household identifications that correspond to the one or more matched, hashed identifications.

2. The processor-implemented method of claim 1, further comprising storing the first customer data at a cloud-based first data repository managed by the first node and the second customer data at a cloud-based second data repository managed by the second node.

3. The processor-implemented method of claim 2, wherein the first customer data corresponds to a plurality of first customers and the second customer data corresponds to a plurality of second customers.

4. The processor-implemented method of claim 1, further comprising inserting a salting file within the normalized element of PII to create a salted identification wherein the salting file is not accessible to the first or second nodes of the private, cloud-based, peer-to-peer network.

5. The processor-implemented method of claim 1, wherein the first customer data includes at least one data attribute that is different from the second customer data.

6. The processor-implemented method of claim 1, wherein hashing the normalized PII element includes a plurality of iterations of a Password Based Key Derivation Function.

7. The processor-implemented method of claim 1, wherein in response to: 1) receiving one or more hashed identifications from the first node at includes authorizing matching the one or more hashed identifications at a central data rights registry managed by a backend network account manager node.

8. The processor-implemented method of claim 1, wherein matching the one or more hashed identifications from the first node to one or more hashed identifications at the second node includes resolving each of the one or more matched hashed identifications to a household identification corresponding to both the first customer data and the second customer data.

9. A system for sharing customer data among particularly-configured nodes of a private, cloud-based, peer-to-peer network without disclosing personally identifiable data of the customer data, the system including a processor and a memory for storing processor-executable instructions to:
   normalize an element of personally-identifiable information (PII) for each first customer data at a first node and each second customer data at a second node of the private, cloud-based, peer-to-peer;
   hash the normalized PII element to create a hashed identification for each first customer data at a first node and each second customer data at a second node of the private, cloud-based, peer-to-peer network, wherein each unique hashed identification corresponds to a household identification;
   in response to: 1) one or more hashed identifications received from the first node at the second node, and 2) the one or more hashed identifications from the first node that match one or more hashed identifications at the second nod data;
   send, from the second node to the first node, one or more of: 1) a count of household identifications that correspond to the one or more matched, hashed identifications and 2) the household identifications that correspond to the one or more matched, hashed identifications.

10. The system of claim 9, further comprising instructions to store the first customer data at a cloud-based first data repository managed by the first node and the second customer data at a cloud-based second data repository managed by the second node.

11. The system of claim 10, wherein the first customer data corresponds to a plurality of first customers and the second customer data corresponds to a plurality of second customers.

12. The system of claim 9, further comprising instructions to insert a salting file within the normalized element of PII to create a salted identification, wherein the salting file is not accessible to the first or second nodes of the private, cloud-based, peer-to-peer network.

13. The system of claim 9, wherein the first customer data includes at least one data attribute that is different from the second customer data.

14. The system of claim 9, wherein the instructions to hash the normalized PII element includes a plurality of iterations of a Password Based Key Derivation Function.

15. The system of claim 9, wherein in response to: 1) the one or more hashed identifications received from the first node at the second node includes instructions to authorize matching the one or more hashed identifications at a central data rights registry managed by a backend network account manager node.

16. The system of claim 9, wherein instructions to match the one or more hashed identifications from the first node to one or more hashed identifications at the second node includes instructions to resolve each of the one or more matched hashed identifications to a household identification corresponding to both the first customer data and the second customer data.

\* \* \* \* \*